Dec. 16, 1952 P. DESCHAMPS 2,622,154

TELEPHONE SUBSTATION SET WITH MULTISTATION CONNECTION SWITCH

Filed Feb. 11, 1948 3 Sheets-Sheet 1

INVENTOR
PIERRE DESCHAMPS
BY Lucke & Lucke
AGENTS

TELEPHONE SUBSTATION SET WITH MULTISTATION CONNECTION SWITCH

Filed Feb. 11, 1948 3 Sheets-Sheet 2

INVENTOR
PIERRE DESCHAMPS
BY Lucke & Lucke
AGENTS

TELEPHONE SUBSTATION SET WITH MULTISTATION CONNECTION SWITCH

Filed Feb. 11, 1948

3 Sheets-Sheet 3

INVENTOR
PIERRE DESCHAMPS
BY Lucke & Lucke
AGENTS

Patented Dec. 16, 1952 2,622,154

UNITED STATES PATENT OFFICE 2,622,154

TELEPHONE SUBSTATION SET WITH MULTI-STATION CONNECTING SWITCH

Pierre Deschamps, Paris, France

Application February 11, 1948, Serial No. 7,669
In France January 17, 1945

3 Claims. (Cl. 179—99)

The invention relates to telephone systems; and it is more especially although not exclusively concerned, among these systems, with such systems including private stations.

Its chief object is to provide a system of this kind which is better adapted to meet the requirements of practice than those used up to now.

It consists, chiefly in replacing the push-piece controls making connection with the stations of lines by a rotary member or disc, acting in a particular mechanical manner to be hereinafter set forth on the contacts to be actuated; this rotary member or disc being advantageously constituted by the network dialling disc or dial.

Preferred embodiments of the present invention will be hereinafter described with reference to the accompanying drawings, given merely by way of example and in which.

Figure 1:
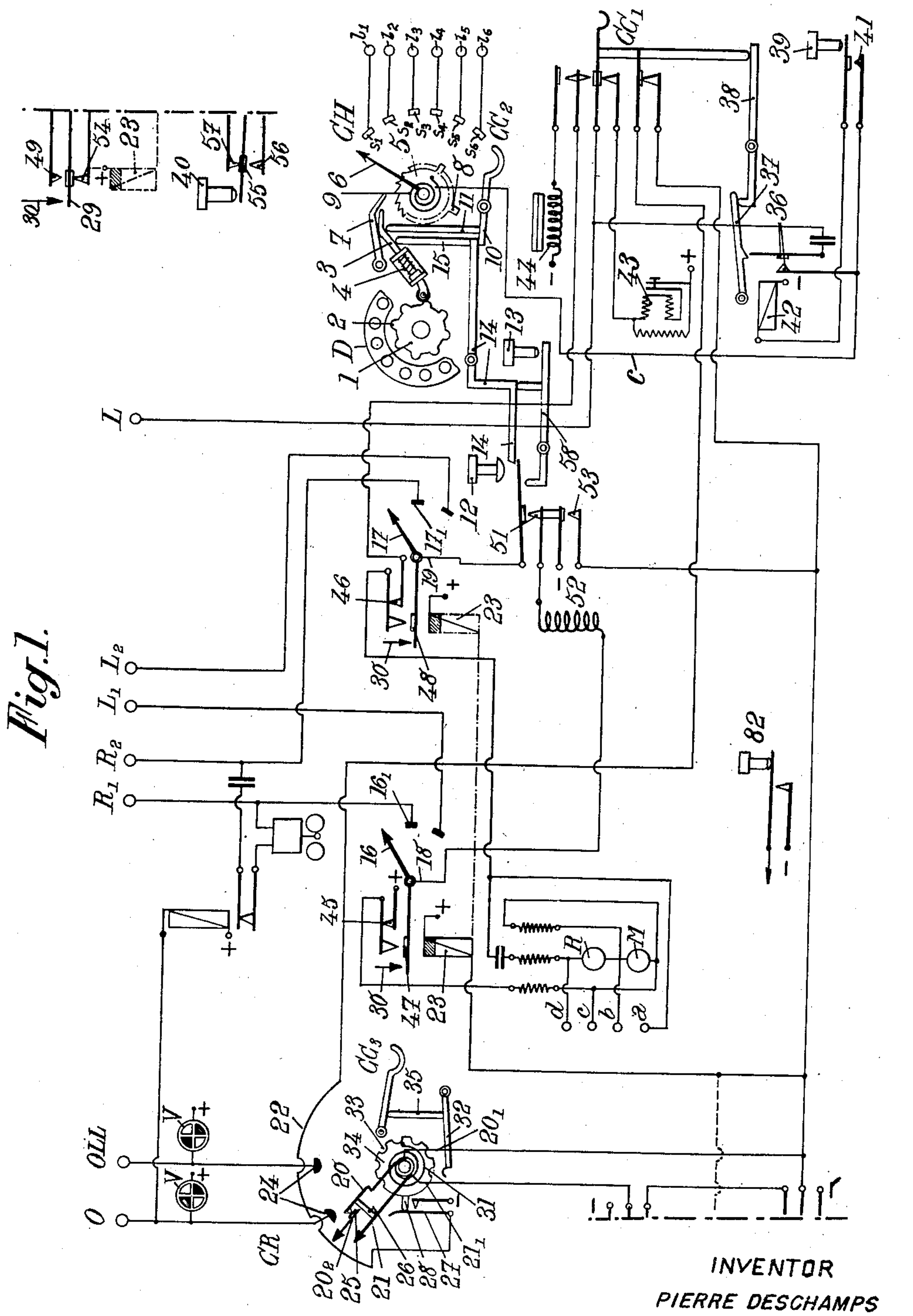
Fig. 1 is an electric diagram of a station according to the invention.

Fig. 1 shows the circuits of a telephone system station arranged according to my invention with, at L, the private system wire, at $R_1$, $R_2$ the wires of one of the network lines to be used by the plant, at $L_1$, $L_2$ a long distance line (if it is supposed that such a line exists), at O and OLL the occupation wires of the network and of the long distance line, such wires being provided respectively at all the stations of the private system. A switch CH is, on the other hand, provided, the fixed contact studs $s_1$–$s_6$ etc., which are disposed in a circular row and respectively connected with lines $l_1$, $l_2$, $l_3$, $l_4$, $l_5$, $l_6$, etc., leading to said other stations, the rotary arm 6 of this switch CH being connected with the station local circuit c.

The dialling disc D is rigid with a wheel 1 fitted with teeth or projections 2 acting in cam-like fashion to reciprocate a sliding member 3 subjected to the action of a return spring 4. This reciprocating member 3 drives, step by step, a ratchet wheel 5 which carries the movable contact 6 of switch CH, this ratchet wheel 5 being held back by a retaining pawl 7.

It will therefore be seen that dialling disc D, when rotated, causes, through the above described means, switch arm 6 to rotate in clockwise direction. In order to call any station 1, 2, 3, etc., it suffices to pass, opposite the end of reciprocating member 3, a number of cam projections 2 equal to the number of this station by rotating disc 1, and therefore the dialling disc D, one or several times according as this number is lower or higher than 10, the plant being capable of including up to thirty stations, even more). At the end of the operation, the contact arm 6 of switch CH stops opposite the contact stud $s_1$, $s_2$, $s_3$, etc. corresponding to the chosen station. However, as it is necessary to be able to use dialling disc D to call a line of the network without interference from ratchet wheel 5, I provide on the latter an abutment 8 (Fig. 1) which, at the end of the movement of said ratchet wheel, moves sliding piece 3 away from the ratchet wheel and makes it inoperative for the remainder of the operation of disc D.

Figures 3, 4:
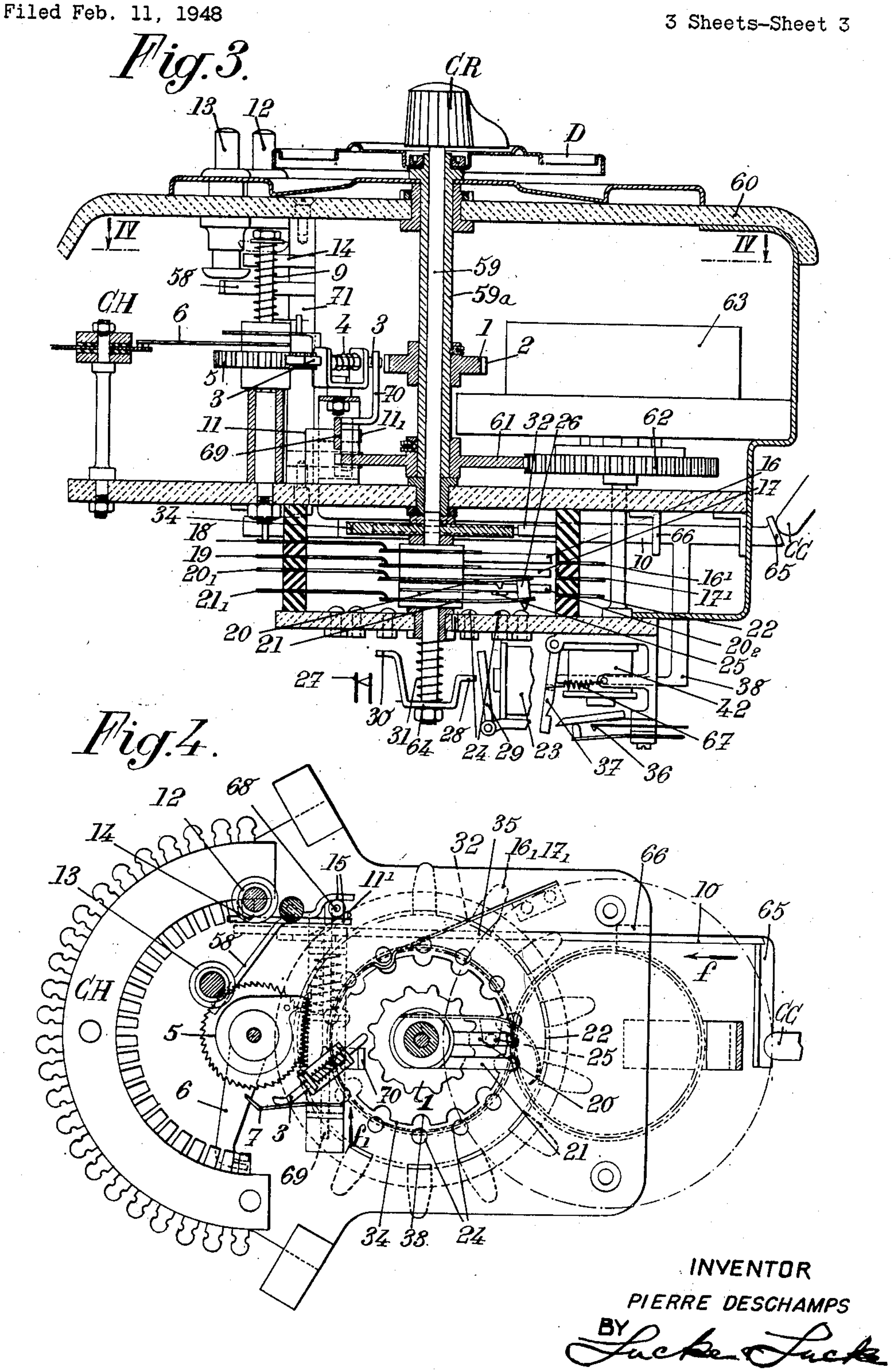

On the other hand, it is necessary to be able to return switch CH to zero position at the end of the conversation, for which purpose ratchet wheel 5 is subjected to the action of a return spring 9 and the switch hook $CC_2$ is connected to parts 3 and 7 in such manner that, when the receiver is hung back to its hook, ratchet wheel 5 is released and comes back to zero under the action of said spring 9. This action is exerted for instance through pieces 10, 11 (Figs. 1, 3 and 4).

It should be noted that, in Fig. 1, the hook is shown at $CC_1$ (corresponding to its true position) and also at $CC_2$ and $CC_3$, it being understood that these last mentioned positions are given merely for the sake of clarity of the drawing, but correspond to the same part.

Release of ratchet wheel 5 may further happen in other circumstances, in particular through the operation of buttons 12 and 13, which will be hereinafter referred to, parts 3 and 7 being then acted upon by pieces such as 14, 15.

Concerning now the network switch, it is for instance constituted by an apparatus with a triple row of contacts, two rows of movable brushes 16, 17 with contact studs $16_1$, $17_1$, and fixed brushes 18, 19 constituting a bipolar switch intended to close the chosen line $R_1$, $R_2$, while the third row of movable brushes 20, 21, with fixed brushes $20_1$, $21_1$ and a sector 22, is intended, through the operation of a relay 23, to switch on of the talking circuit and to bring the occupation circuit into action. (This relay 23 is, in Fig. 1, shown in three different positions for the sake of comprehension of the diagram.)

Concerning the third rows of contacts, its movable brush 21 is intended to cooperate with contact studs 24, connected with the occupation circuits; as for movable brush 20, it is in fact constituted by two elements 20 and $20_2$, the first of which is in contact with fixed brush $20_1$, while the second one is in contact with sector 22, these two elements being adapted either to come into contact at 25 or on the contrary to be away from each other and this when brush 21 happens to pass on a contact stud 24, thus lifting the element 20 through the insulating piece 26.

The network switch, or the spindle thereof, is further provided with means for enabling it, in its zero position, to perform various functions taking place when the receiver is returned to its hook. Thus it comes to open a contact 27, by means of abutment element 28, for the purpose that will be indicated hereinafter. Likewise it mechanically keeps in holding position the armature 29 of relay 23, through part 30 (diagrammatically represented by arrows on Fig. 1) for reasons which are also to be set forth hereinafter.

The return of the network switch into zero position is obtained through a spring 31 acting upon the spindle of said switch. This switch is yieldingly held in every working position by a pawl 32 cooperating with a system of notches 33 carried by a piece 34. When the receiver is replaced upon its hook, and as indicated at $CC_3$, Fig. 1, pawl 32 is moved away from piece 34, under the action of connecting member 35 and spring 31 can then act freely.

Finally, the system includes a private secret device which essentially includes, for instance, two contacts 36 suitably interposed in the circuits and which are engaged, when the private station that is considered is called, under a piece 37, which is in turn controlled by the switch hook $CC_1$, through connection 38. When the receiver is replaced on its hook, these contacts are released (position shown by the drawing).

This plant, combined with a plurality of push buttons or other controlling means, such as shown at 39, 12, 40, 13 respectively for calling on a private line, switching to the private systems, switching the network to a private line and switching back to this network, works for instance in the following manner:

*Position of the elements corresponding to the receiver resting on its hook*

The position of the various parts (as shown by the diagram of Fig. 1) is as follows:

*a.* The network switch is in zero position, piece 32 being away from piece 34 whereby spring 31 has been able to act on said switch.

*b.* Relay 23, through which no current is flowing, is however mechanically kept in holding position by piece 30 (network switch in zero position).

*c.* Contact is open at 27.

*d.* The private secret circuit is cut off at 36, due ot the fact that the contacts of the system have been able to disengage from operating piece 37 which is lifted as a consequence of the fact that the receiver hook is depressed.

*Calling for a line of the private system*

The caller, having removed the receiver from its hook, operates dialling disc D according to the number of the private station to be called. Accordingly, wheel 1 is driven and causes, through sliding piece 3, the brush 6 of switch CH to be actuated. At the end of this operation, the brush stops on the contact stud $s_1$, $s_2$, $s_3$, etc. of the line $l_1$, $l_2$, $l_3$, etc. corresponding to the desired private station (only six contact studs have been shown, by way of example).

On the return of disc D, wheel 1 rotates in the opposed direction, but switch CH remains in position.

It then remains to call the desired station, which is done by depressing button 39, which, closing contacts 41, sends a negative polarity through relay 42, toward the wire L of the desired station, so as to come finally to the buzzer 43 of this station, and provided that the said station is free.

The contacts 36 of the calling station are, at the same time, brought toward the closing position by relay 42 and locked on piece 37, which is lowered due to the lifting of the receiver hook of this station.

At the called station the receiver is lifted and conversation may take place, in the conventional fashion.

If the receiver of the desired station is already removed from its hook, the call cannot take place since the negative polarity sent through relay 42 meets with another negative polarity at 44, at the desired station. On the other hand, contacts 36 remain open, at the calling station, which ensures secrecy.

Anyway, when the conversation is finished, the return of the receiver onto its hook causes switch CH to return to zero position through the action of the switch hook at $CC_2$, 10, 11.

*Taking or switching to the network*

It is now supposed that the operator at the station that is being considered wishes to connect with one of the lines of the network.

He moves the index of network switch CR to the desired line.

Due to this operation, part 28 first closes the contact at 27, which has for its effect to supply relay 23 with current through: —, 27, sector 22, movable brushes 20, 25, 20, fixed brush $20_1$, relay 23, +. Said relay therefore remains in holding position, despite the release of the mechanical locking at 30.

Then, when brush 21 arrives on the contact stud corresponding to the chosen line $R_1R_2$, the circuit is cut off at 25, which releases relay 23, therefore opens the contacts 45, 46 and closes contacts 47, 48. The conversation circuit MR (connected at *abc* to the dial) is thus closed on said line $R_1R_2$, through contacts 16, 17 which have been directed to this line in correspondence with contact stud 24 (on the drawing, a single line $R_1$, $R_2$ has been shown, for the sake of simplification).

If it were desired to obtain a long distance line, the same operation would be performed, as shown on the drawing at OLL and at $L_1L_2$.

On the other hand, occupation is indicated by contacts 49 and 29 which have been closed at the same time at 47 and 48 and which feed indicators V.

*Passing a network line to a private station*

Having obtained a line of the network, it is desired to pass or switch it to another private station of the private system.

For this purpose, button 12 is depressed, which acts upon piece 14 and closes contact 51, thus connecting the network with keeper coil 52.

At the same time, contact 53 restores relay 23 to holding position and feeds current to the occupation circuit through 53 and the negative terminal.

On the other hand, the operation of button 12 has applied pieces 14 and 15 against sliding member 3 and pawl 7 and brought back to zero the movable brush 6 of switch CH; at this time the conversation circuit is again connected with the private system and the network being held in keeping, it is possible to call any station of the private system in the manner above indicated.

Having obtained the called person, the operator tells him which line of the network he is to take, by allowing the indicator to disappear through operation of the switching button 40, which keeps relay 23 in holding position, through contacts 55 and 56, and clears the occupation circuit by opening contacts 57 and 55 (contacts 55—56 will be made before the breaking of 57—55). The called person having suitably rotated his network switch, the indicator has reappeared. The initial station having then returned the receiver onto its hook consequently returns its network switch to zero position.

*Switching back to the network*

After having talked with a private station, the operator of the station that is being described may switch back to the line of the network he had held in keeping. For this purpose, he releases button 12 through operation of button 13, which brings back the first mentioned into upper position, through piece 58 connected with piece 14, and cuts off the circuit 53, thus releasing relay 23. Line $R_1R_2$ is consequently again connected with the conversation circuit.

Figure 2:
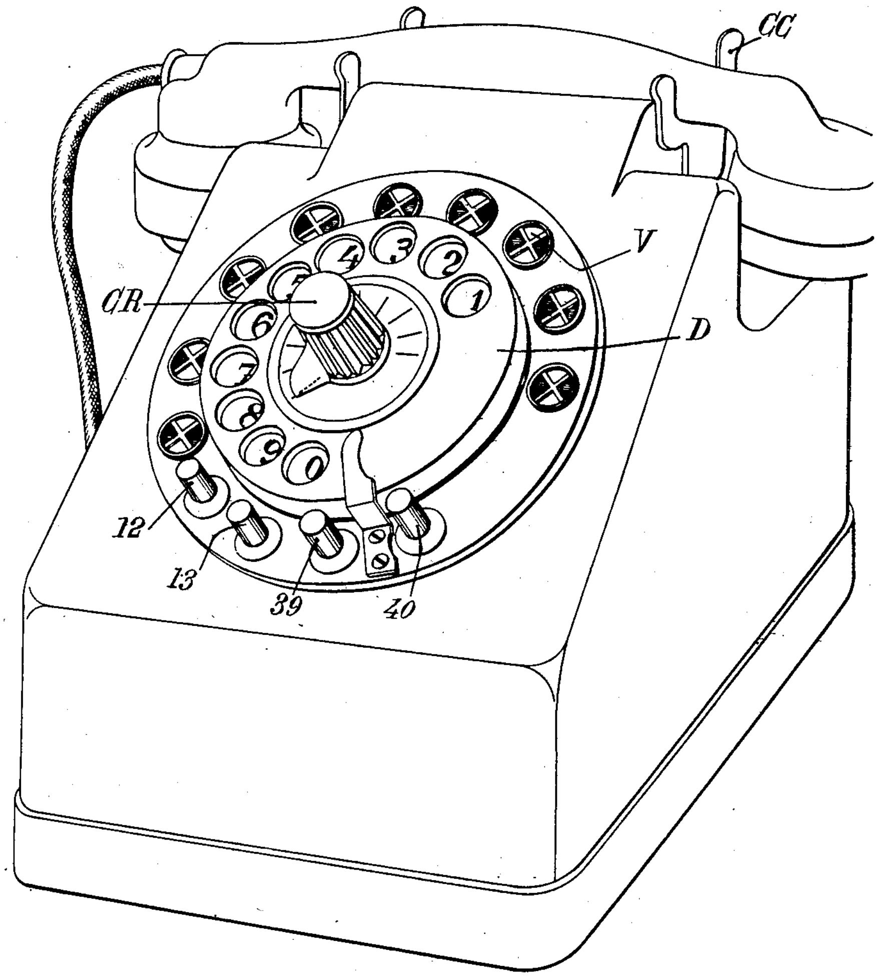
Figs. 2 to 4 show, respectively in external perspective view, in vertical section and in plan view, a station made according to said diagram.

It will be seen that, anyway, all operations finally consist in exclusively operating disc D, network switch CR and the four buttons 12, 13, 39, 40, the whole being advantageously arranged, as shown by Fig. 2, with the network switch at the center of the disc and the indicators V grouped about this disc, same as the four above mentioned buttons.

Concerning the arrangement of the stations, from the constructional point of view, it is possible to proceed in various ways, in particular that shown by Figs. 3 and 4 and given merely by way of example.

According to this embodiment, the sleeve 59*a* of disc D, which extends through casing 60 and controls at 61, 62 the impulse device of the known type 63 carries the above mentioned disc 1 with the parts annexed thereto and switch CH and spindle 59 carries, at its lower part, the network switch with several rows of movable contacts 16, 17, 20, 21, etc., of fixed contacts 18, 19, $20_1$, $20_2$, contact studs $16_1$, $17_1$ and sector 22.

At the base is provided the return spring 31 and a piece 64 two projections 28 and 30 of which play the part above mentioned with respect to contact 27 and to the armature 29 of relay 23.

On the other hand the part 10 intended to control various pieces under the effect of the return of the receiver onto its hook, this hook acting at 65, is constituted by a sliding piece guided at 66 and carrying, on the one hand, a bent extension 38 which acts upon piece 37 with its spring 67, on the other hand, a finger 35 capable of cooperating with pawl 32 and, finally, another finger 11, with an inclined surface $11_1$, adapted to cooperate with an axis 68 carried by the end of a rod 69 provided with a projection 70, which can act upon sliding piece 3.

It will be seen that the displacement of part 10 in direction *f* under the effect of the return of the receiver onto its hook causes:

Piece 37 to be lifted,
Pawl 32 to be lifted at 35,
Rod 69 to be moved in direction *f'*, sliding piece 3 to be lifted and in turn to lift pawl 7.

On the other hand, the means 14 and 58 for engaging buttons 12 and 13, are constituted by two arms carried as a whole by an axis 71, with a fork-shaped extension 15 engaging on axis 68, this extension being itself subjected to the action of inclined surface $11_1$.

It can thus be seen that, on the one hand, the return of the receiver on its hook has for its effect to lift both of the buttons 12 and 13, by swinging arms 14 and 58 but that, on the other hand, the swinging of these arms, when button 12 is pushed down, has for its effect to cause, independently of piece 10 and inclined surface $11_1$, the release of switch CH through operation of rod 59 by means of fork 15.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In a telephone system including a plurality of lines and at least one calling station having a local circuit, a selecting device at this station including a fixed circular row of contact studs connected respectively with said lines, a dialling rotary disc operable manually in one direction through a plurality of consecutive angular positions about its axis, return spring means for urging said disc to rotate in the opposite direction, a rotary switch including a movable contact arm connected with the station local circuit and pivoted about the axis of said circular row of contact studs so as to run succssively over the respective contact studs of said row, a ratchet wheel carrying said contact member, a return spring for urging said ratchet wheel backward, a holding pawl adapted to cooperate with said ratchet wheel, a reciprocating sliding member mounted to engage said ratchet wheel to rotate it step by step, a return spring for said sliding member, and a wheel operatively connected with said dialling disc to be driven by it, said wheel being provided with cam projections arranged to cooperate with said reciprocating sliding member to drive it successively toward said ratchet wheel against its return spring for said first mentioned direction of rotation of said disc.

2. In a telephone system including a plurality of lines and at least one calling station having a local circuit, a selecting device at this station including a fixed circular row of contact studs connected respectively with said lines, a dialling rotary disc operable manually in one direction through a plurality of consecutive angular positions about its axis, return spring means for urging said disc to rotate in the opposite direction, a rotary switch including a movable contact arm connected with the station local circuit and pivoted about the axis of said circular row of contact studs so as to run successively over the respective contact studs of said row, a ratchet wheel carrying said contact member, a return spring for urging said ratchet wheel backward, a holding pawl adapted to cooperate with said ratchet wheel, a reciprocating sliding member mounted to engage said ratchet wheel to rotate it step by step, a return spring for said sliding member, a wheel operatively connected with said dialling disc to be driven by it, said wheel being provided with cam projections arranged to cooperate with said reciprocating sliding member to drive it successively toward said ratchet wheel against its return spring for said first mentioned direction of rotation of said disc, and means carried by said ratchet wheel for making said reciprocating sliding member inoperative once said ratchet wheel has turned through the angle corresponding to said finder contact being located on the last of said contact studs.

3. In a telephone system including a plurality of lines and at least one calling station having a local circuit, a selecting device at this station including a fixed circular row of contact studs connected with said lines and a rotary arm adapted to run on said contact studs to connect them with said local circuit, a dialling rotary disc operable through a plurality of consecutive angular dialling positions about its axis, means operative by said disc for rotating said arm forward from one of said contact studs to the next one in response to rotation of said disc in one direction from one of said dialling positions to the next one, and means for opposing backward rotation of said arm during further rotation of said disc in the other direction, whereby accumulative progression of said arm along said row of contact studs can be obtained in response to successive reciprocating operations of said dialling disc.

PIERRE DESCHAMPS.

REFERENCES CITED

The following references are of record in the file of this patent:

UNITED STATES PATENTS

| Number | Name | Date |
|---|---|---|
| 1,191,210 | Martin | July 18, 1916 |
| 1,221,124 | Williams | Apr. 3, 1917 |
| 1,569,450 | Bohlman | Jan. 12, 1926 |
| 1,992,389 | Moser | Feb. 26, 1935 |